United States Patent
Kobayashi et al.

(10) Patent No.: US 8,067,870 B2
(45) Date of Patent: Nov. 29, 2011

(54) MOTOR AND ELECTRONIC APPARATUS HAVING THE SAME

(75) Inventors: Masahiko Kobayashi, Hyogo (JP); Yasuo Yonei, Osaka (JP); Tooru Nakamaru, Osaka (JP); Norihito Yasuda, Osaka (JP); Hiroki Asai, Hyogo (JP); Hiroyuki Asai, Hyogo (JP); Kouji Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 12/535,174

(22) Filed: Aug. 4, 2009

(65) Prior Publication Data

US 2010/0033050 A1    Feb. 11, 2010

(30) Foreign Application Priority Data

Aug. 7, 2008 (JP) .................. 2008-203987

(51) Int. Cl.
*H02K 21/12* (2006.01)

(52) U.S. Cl. ......... 310/156.05; 310/156.12; 310/156.06; 310/68 B; 310/156.26; 310/156.38; 310/156.44

(58) Field of Classification Search ............. 310/156.05, 310/156.12, 156.06, 68 B, 156.26, 156.38, 310/156.44
See application file for complete search history.

(56) References Cited

U.S. PATENT DOCUMENTS

| | | | | |
|---|---|---|---|---|
| 4,764,788 A * | 8/1988 | Watashi et al. | ............... | 399/214 |
| 4,905,110 A * | 2/1990 | Krum et al. | ............... | 360/99.08 |
| 5,408,153 A * | 4/1995 | Imai et al. | ................... | 310/68 B |
| 5,442,247 A * | 8/1995 | Suzuki et al. | ............... | 310/67 R |
| 5,777,415 A * | 7/1998 | Suzuki et al. | ............ | 310/156.05 |
| 5,796,200 A * | 8/1998 | Sakashita et al. | ........ | 310/156.05 |
| 5,907,206 A * | 5/1999 | Shiga et al. | ............. | 310/156.05 |
| 6,657,328 B2 * | 12/2003 | Shiga et al. | ..................... | 310/26 |
| 6,700,280 B1 * | 3/2004 | Geiger et al. | ................. | 310/193 |
| 6,817,507 B2 * | 11/2004 | Yeon | ............................. | 226/188 |
| 7,242,121 B2 * | 7/2007 | Kadowaki | ............... | 318/400.04 |
| 2003/0062787 A1 * | 4/2003 | Kobayashi | ............... | 310/156.12 |
| 2005/0099080 A1 * | 5/2005 | Matsumoto et al. | ..... | 310/156.26 |
| 2006/0055266 A1 * | 3/2006 | Iwami et al. | ............. | 310/156.47 |

FOREIGN PATENT DOCUMENTS

| | | | |
|---|---|---|---|
| JP | 10108431 A | * | 4/1998 |
| JP | 11-018393 A | | 1/1999 |
| JP | 2000-069698 A | | 3/2000 |
| JP | 2001052921 A | * | 2/2001 |
| JP | 2001069738 A | * | 3/2001 |
| JP | 2002204558 A | * | 7/2002 |
| JP | 2006-314165 A | | 11/2006 |

* cited by examiner

*Primary Examiner* — Quyen Leung
*Assistant Examiner* — Alex W Mok
(74) *Attorney, Agent, or Firm* — Brinks Hofer Gilson & Lione (57) ABSTRACT

The motor of the invention is an outer rotor type motor, and a rotor includes a cylindrical rotor frame that is opened at one end thereof in an axial direction, and a hollow cylindrical magnet attached to an inner periphery of the rotor frame. The magnet has a joining portion joined to an inside cylindrical portion of the rotor frame, and a protruding portion that further protrudes in the axial direction from one end, the outer diameter of the protruding portion is larger than the inner diameter of the rotor frame, and the joining portion is directly brought into close contact with a portion ranging from the one end to at least a portion of the inside cylindrical portion.

8 Claims, 5 Drawing Sheets

MOTOR AND ELECTRONIC APPARATUS HAVING THE SAME

RELATED APPLICATIONS

This application claims priority under 35 U.S.C. §119 to Japanese Patent Application No. JP2008-203987 filed on Aug. 7, 2008, the entire content of which is hereby incorporated by reference.

FIELD OF THE INVENTION

The present invention relates to an outer rotor type motor, and specifically, to a motor having a rotor in which a magnet is directly attached to a rotor frame, and an electronic apparatus having the same.

DESCRIPTION OF RELATED ART

In recent years, miniaturization of electronic apparatuses has progressed, and miniaturization is requested even in a motor to be loaded on electronic apparatuses, such as a copying machine and a printer. Additionally as such a motor, a brushless DC motor that can easily control rotation is generally loaded on the above apparatuses.

As a means for detecting rotational speed in order to control rotation, a speed detection means using the electric power generation function is widely utilized. This speed detection means is generally called a frequency generator or FG for short. In order to generate an electric power generation signal (hereinafter referred to as a FG signal) for speed detection in the frequency generator, a power-generating magnetic pattern is magnetized (hereinafter referred to FG magnetization) on a magnet of the rotor for example. A FG pattern that is constituted by a zigzag wiring pattern or the like that outputs a FG signal is arranged to face the FG magnetization.

Meanwhile, if the structure of the frequency generator is simply made small along with miniaturization when miniaturization of such a brushless DC motor is attained, generated output also decreases and the output level of the FG signal also becomes small. Moreover, with miniaturization, a FG magnetized portion is brought closer to a main magnetized portion or an iron core of a stator for driving of a motor. For this reason, the frequency generator is influenced by main magnetization or the magnetism emitted from the iron core, and this magnetism easily superimposes into the FG signal as a noise. When miniaturization of the brushless DC motor is attained, there is a possibility that the detection precision of rotational speed or a rotational position may deteriorate due to such a factor.

For this reason, a technique of improving the detection precision of the rotational speed or position is conventionally suggested (for example, refer to Japanese Patent Unexamined Publication No. 11-18393 and Japanese Patent Unexamined Publication No. 2006-314165). That is, in Japanese Patent Unexamined Publication No. 11-18393, a magnet is provided with a protruding portion that protrudes from a lower end surface of a rotor frame to, a protruding portion is formed with a speed detection magnetized portion that is subjected to speed detection magnetization, and a speed detection sensor is arranged at an outer periphery of the speed detection magnetized portion. Thereby, Japanese Patent Unexamined Publication No. 11-18393 reduces the influence of the main magnetization to the speed detection magnetization, and acquires a stable speed detection signal.

Additionally, in Japanese Patent Unexamined Publication No. 2006-314165, a driving magnet is provided with a protruding portion that protrudes from a lower end surface of a rotor holder, and a speed and position detecting magnet is fixedly press-fitted into an outer peripheral surface of the protruding portion. FG magnetization for a frequency generator is performed on a lower end surface of this detecting magnet. Since this increases the distance between the FG magnetization and driving magnetization, the frequency generator hardly receives magnetic influence from the driving magnetization. As a result, the reading accuracy of speed detection improves.

Additionally, when miniaturization of the brushless DC motor is attained, other following problems occur. That is, for example, when the structure of the rotor or the balance of weight is bad, the influence on the concentricity or roundness of rotation becomes greater with the miniaturization. Moreover, for example, an adhesive is utilized as a means for joining the driving magnet to an outer rotor type rotor frame. Meanwhile, the thickness of the adhesive may become uneven depending on the location by a volume change or the like, before and after curing of the adhesive. In this case, the center of the magnet shifts, the deflection of an inner periphery of the magnet becomes larger, and the roundness of the magnet of the rotor decreases. This causes an irregular rotation. Such inconvenience caused by the adhesive becomes conspicuous with the miniaturization.

Against such a problem, conventionally, a technique of press-fitting a driving magnet into a rotor frame without using an adhesive to join them, thereby enhancing the rotational accuracy, is also suggested (for example, refer to Japanese Patent Unexamined Publication No. 2000-69698). That is, in Japanese Patent Unexamined Publication No. 2000-69698, a magnet made of a bonded magnet that has a slightly larger outer diameter than the inner diameter of the rotor frame is press-fitted into the rotor frame. The rotor frame and the magnet are joined together by the elastic force of the magnet that acts in the radial direction from the center of the magnet. By using such a technique, steps are markedly simplified compared with a case where an adhesive is used. Moreover, the positional accuracy, roundness, etc. of the magnet are sufficiently secured.

However, Japanese Patent Unexamined Publication No. 11-18393 and Japanese Patent Unexamined Publication No. 2006-314165 has a configuration in which the speed detection sensor is arranged or the detecting magnet is arranged further outside the outer periphery of the magnet. For this reason, the configurations of both the documents become large structurally, and are unsuitable for miniaturization. Additionally, in Japanese Patent Unexamined Publication No. 2006-314165, the detecting magnet is required in addition to the driving magnet. Therefore, problems occur in that the number of parts may increase and the number of assembling steps also may increase.

In Japanese Patent Unexamined Publication No. 2000-69698, the driving magnet is configured so as to be fixedly press-fitted into the rotor frame. Accordingly, for example, when FG magnetization is performed on the lower surface of the driving magnet, as described above, a FG magnetized portion approaches the main magnetized portion or the iron core of the stator. Accordingly, for example, a FG pattern for speed detection is also required to approach the main magnetized portion. As a result, such a configuration has a problem in that the FG pattern is easily influenced by the magnetism caused by the main magnetization or the iron core, and the reading accuracy of speed detection deteriorates.

SUMMARY OF THE INVENTION

The motor of the invention has the following configuration.

The motor is an outer rotor type motor including a stator and a rotor that is rotatably arranged on the outer peripheral side so as to face the stator, and the rotor includes a cylindrical rotor frame that is opened at one end thereof in an axial direction, and a hollow cylindrical magnet attached to an inner periphery of the rotor frame. The rotor frame has an inside cylindrical portion with a predetermined inner diameter on the inner peripheral side thereof. The magnet has a joining portion joined to the inside cylindrical portion, and a protruding portion that further protrudes in the axial direction from the one end of the rotor frame.

Here, the outer diameter of the protruding portion of the magnet is larger than the inner diameter of the rotor frame, and the joining portion of the magnet is directly brought into close contact with a portion ranging from the one end of the rotor frame to at least a portion of the inside cylindrical portion.

The invention further includes an electronic apparatus having a main body case, a driven body provided within the main body case, and a motor connected with the driven body via a link mechanism.

By this configuration, the invention can provide a motor and an electronic apparatus having the same that can reduce the number of assembling steps to reduce cost, and can attain miniaturization without causing deterioration of the rotational accuracy.

DETAILED DESCRIPTION OF THE PREFERRED EMBODIMENTS

Hereinafter, embodiments of the invention will be described referring to the drawings.

Embodiment 1

Figure 1:
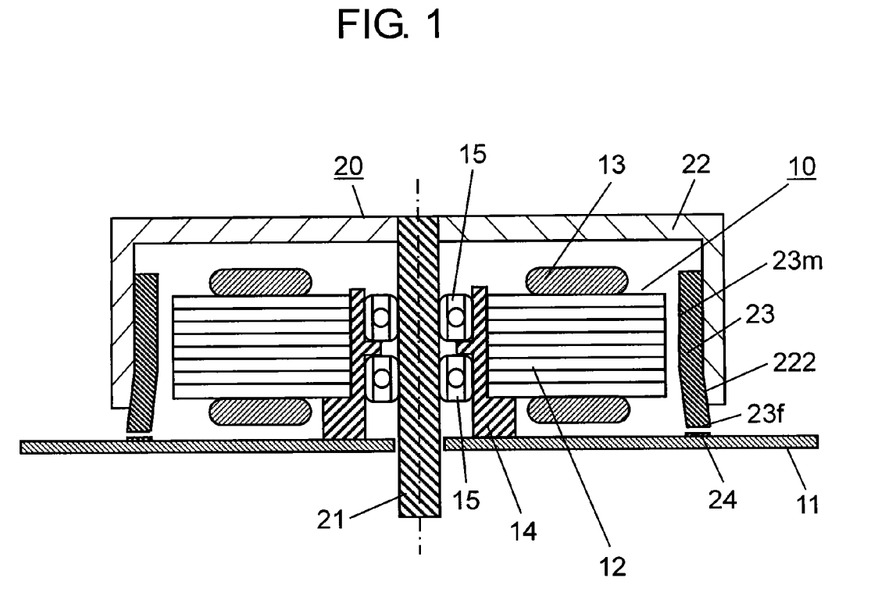
FIG. 1 is a sectional view of a motor in Embodiment 1 of the invention.

FIG. 1 is a sectional view of a motor in Embodiment 1 of the invention. First, the entire configuration of the motor will be described referring to FIG. 1.

As shown in FIG. 1, as an example, the motor of this embodiment that is, an outer rotor type brushless DC motor, includes stator 10, and rotor 20 that is rotatably arranged at the outer peripheral side so as to face stator 10.

Stator 10 includes stator core 12 loaded on board 11. Stator core 12 is formed as a laminate in which a plurality of plate-like bodies is laminated. A plurality of teeth as individual magnetic poles is arranged at predetermined intervals in the circumferential direction at an outer peripheral portion of stator core 12. Coil 13 is wound around an arm portion that constitutes a magnetic circuit inside each tooth. Stator 10 in which coil 13 is wound around stator core 12 is configured in this way. Stator core 12 is fixed to board 11 via housing 14.

The inner periphery of housing 14 is provided with bearing 15. Rotary shaft 21 is arranged so as to pass through bearing 15 in a vertical direction. This embodiment will be described with the side where stator 10 or rotor 20 is loaded on board 11 being upside, and its opposite side being the downside, in the axial direction of rotary shaft 21, i.e., longitudinal direction of rotary shaft 21.

Rotor 20 is composed of rotary shaft 21, frame 22, and magnet 23. Frame 22 is formed of a cylindrical magnetic material that is opened at one axial end, i.e., a lower end of rotary shaft 21. Magnet 23 has a hollow cylindrical shape, and is attached to the inner periphery of frame 22. An upper end that becomes the other end of rotary shaft 21 is fixed to frame 22 in the center of the ceiling surface of frame 22.

Magnet 23 has main magnetized portion 23m that has been subjected to main magnetization that is first magnetization at an inner periphery thereof, and FG magnetized portion 23f that has been subjected to FG magnetization that is second magnetization at a tip end face of a lower end thereof. In this way, magnet 23 is subjected to two kinds of magnetization including the main magnetization and the FG magnetization. For this reason, the driving and speed detection can be performed with simple configuration without increasing the number of parts.

Main magnetized portion 23m is subjected to the main magnetization that alternately forms different poles of a N pole and a S pole at every first predetermined interval. This main magnetization is magnetization for generating a rotational driving force. That is, the magnetic fields of the N pole and S pole are alternately generated from each tooth by applying an alternating current to coil 13. The teeth of the outer peripheral portion of stator core 12 face main magnetized portion 23m at an inner periphery of magnet 23. For this reason, an attractive force and a repulsive force are generated between the magnetic field from each individual tooth, and the main magnetization of magnet 23, and these become the rotational driving force of rotor 20.

FG magnetized portion 23f is subjected to the FG magnetization that alternately forms different poles of the N and S more than the main magnetization at every second predetermined interval so that the pole pitch of the FG magnetization becomes narrower than the pole pitch of the main magnetization. The FG magnetization is magnetization for speed detection, as described above. That is, in order to generate a FG signal for speed detection by electric power generation using magnetism, such a magnetic pattern is magnetized on FG magnetized portion 23f.

Meanwhile, in order to generate a FG signal from the magnetic pattern by the FG magnetization, FG pattern 24 is arranged on board 11 so as to face FG magnetized portion 23f of the lower end of magnet 23. FG pattern 24 is a wiring pattern in which, for example, zigzag printed wiring lines are annularly formed on board 11. When magnet 23 rotates with the rotation of rotor 20, an electromotive force is generated from FG pattern 24. This electromotive force includes a frequency component according to the rotational speed of rotor 20, and this electromotive force is output as a FG signal. In this way, the FG signal includes rotating-speed information and is utilized for the control of the rotational speed of the motor.

In this embodiment, as shown in FIG. 1, an upper portion of magnet 23 including main magnetized portion 23m is fixed so as to be directly brought into close contact with the inner periphery of frame 22. Magnet 23 is attached to frame 22 so that a lower portion of magnet 23 including FG magnetized portion 23f protrude downwards while spreading in an outer peripheral direction from the lower end of the inner periphery of frame 22. The motor of this embodiment has the attachment structure of such magnet 23, and suppresses derivation of unnecessary magnetism to FG pattern 24. Moreover, in this embodiment, tapered portion 222 that guides the lower portion of magnet 23 so as to spread in the outer peripheral direction is formed at a lower end of the inner periphery of frame 22.

By the above configuration, an alternating current is applied to the above coil 13, the magnetic fields of N and S are alternately generated from each tooth, and an attractive force and a repulsive force are generated between each tooth and main magnetized portion 23m. Then, rotor 20 rotates about rotary shaft 21, and the torque thereof is transmitted to a load via rotary shaft 21. The details thereof will be described below.

Next, the detailed configuration of magnet 23 and frame 22 attaching the magnet 23 in the motor of this embodiment will be described.

In this embodiment, an example in which magnet 23 that is a bonded magnet with elasticity is attached to an inside cylindrical portion of frame 22 by press fitting will be described. The bonded magnet is molded by kneading magnet powder and resin that becomes a binder for the magnet powder.

Figure 2:
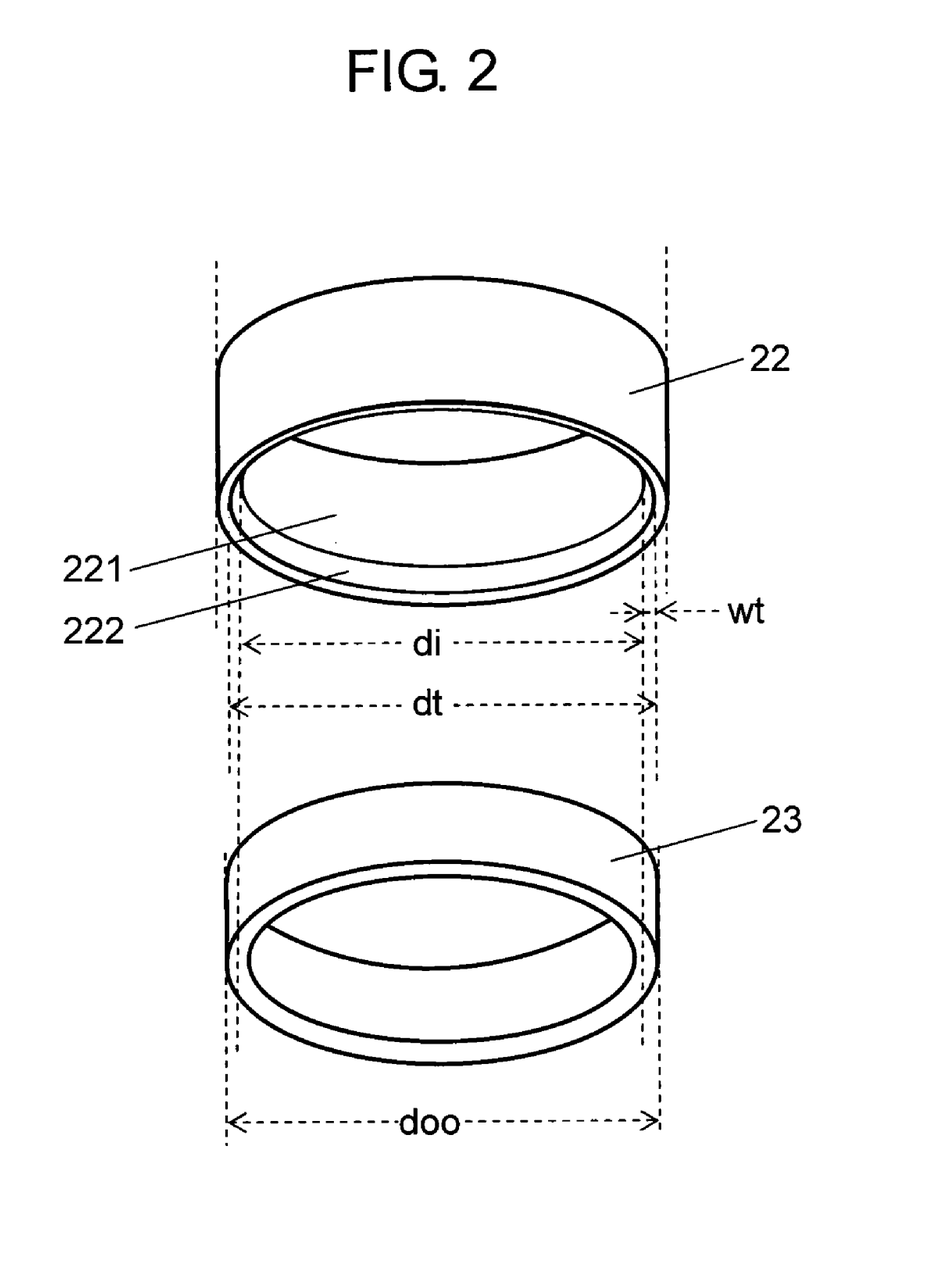
FIG. 2 is a perspective view in a state where a magnet and a frame of the motor are separated from each other.

FIG. 2 is a perspective view in a state where magnet 23 and frame 22 of the motor in this embodiment are separated from each other.

As shown in FIG. 2, frame 22 has inside cylindrical portion 221 and a tapered portion 222 on the inner peripheral side thereof. Inside cylindrical portion 221 has a predetermined inner diameter di. The inner diameter of tapered portion 222 becomes larger towards the lower end of frame 22 from the lower end that is one end of inside cylindrical portion 221. FIG. 2 shows an example in which the lower end of frame 22 has spread in the outer peripheral direction to a larger inner diameter dt than the inner diameter di by a taper width wt by tapered portion 222. Magnet 23 is a bonded magnet with an outer diameter doo.

That is, in a state where frame 22 and magnet 23 are separated from each other, the outer diameter doo of magnet 23 is larger than the inner diameter dt of the lower end of frame 22 or the inner diameter di of inside cylindrical portion 221. Meanwhile, magnet 23 is a bonded magnet with elasticity. For this reason, magnet 23 is directly brought into close contact with and fixed to the inner periphery of frame 22 by pressing-fitting magnet 23 into frame 22 formed of a metallic magnetic material, such as iron.

Figure 3:
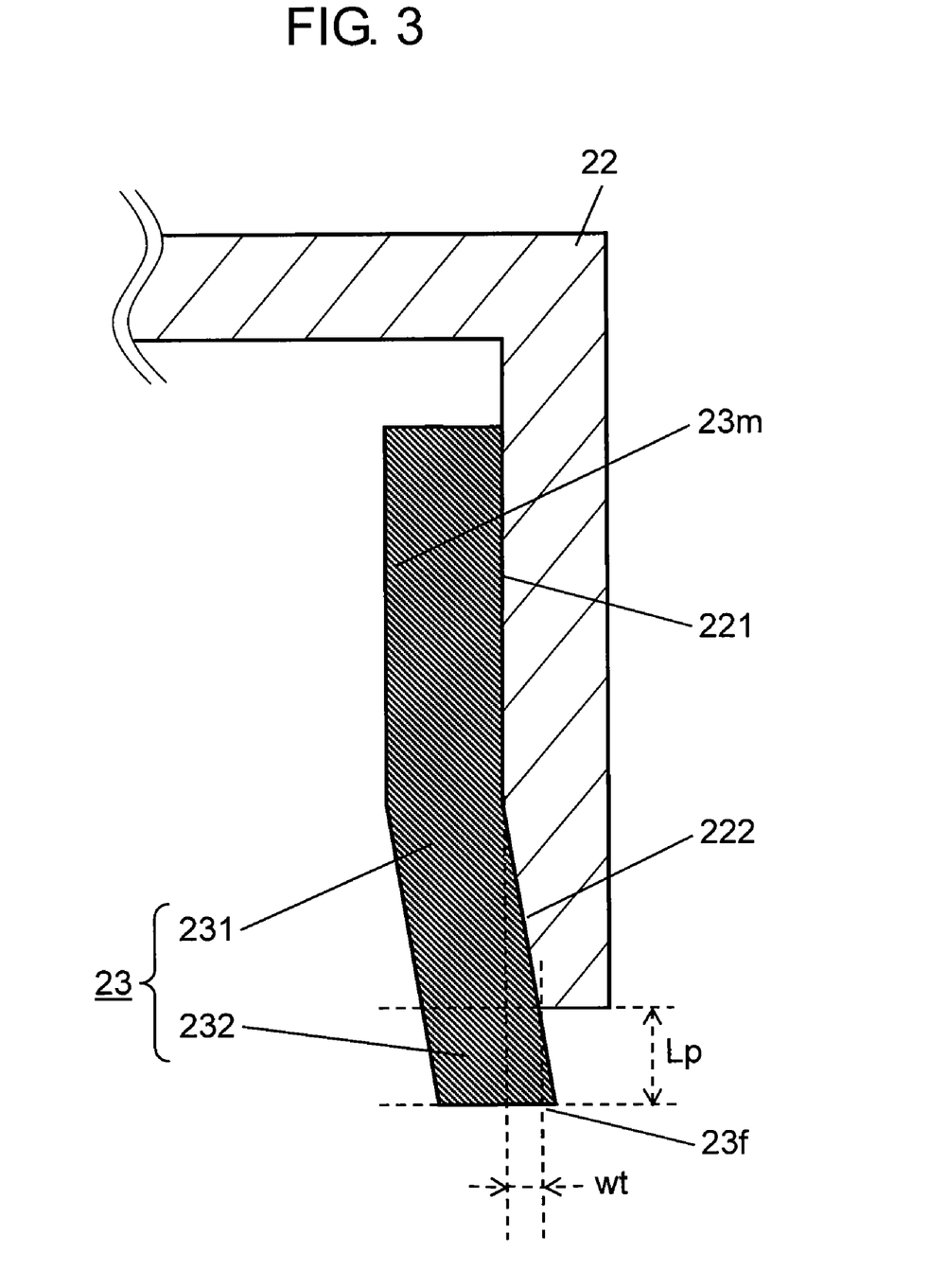
FIG. 3 is an enlarged partially sectional view when the magnet of the motor is attached to the frame.

FIG. 3 is an enlarged partially sectional view when magnet 23 of the motor in this embodiment is attached into frame 22 by press fitting.

As shown in FIG. 3, the inner diameter of tapered portion 222 becomes larger towards the lower end of frame 22 from the lower end of inside cylindrical portion 221. Meanwhile, magnet 23 has joining portion 231 and protruding portion 232. Joining portion 231 has an outer periphery directly brought into close contact with a portion ranging from the lower end of frame 22 via tapered portion 222 to at least a portion of inside cylindrical portion 221. Moreover, protruding portion 232 protrudes further downwards from the lower end of frame 22 by an axial dimension Lp. As shown in FIG. 3, the outer diameter of protruding portion 232 is larger than the diameter, i.e., inner diameter dt of tapered portion 222 at the lower end of frame 22.

Joining portion 231 includes main magnetized portion 23m that is a first magnetized portion. Since frame 22 is formed of a metallic magnetic material, frame 22 functions as a back yoke for joining portion 231, and magnetic flux concentrates on joining portion 231.

Since the motor of this embodiment forms such structure, the hollow cylindrical magnet 23 that has the larger outer diameter doo than the inner diameter di of inside cylindrical portion 221 or the inner diameter dt of the lower end of frame 22 is press-fitted into frame 22 by use of a suitable press-fitting jig or the like, whereby magnet 23 is attached frame 22. That is, in joining portion 231 of magnet 23, an elastic force acts in an outward direction from magnet 23. By this elastic force, magnet 23 is directly brought into close contact with the frame 22 at a joining surface of joining portion 231, in a state where magnet 23 has contracted. For this reason, frame 22 and magnet 23 can be integrated without using an adhesive or the like, and the roundness of the rotor can be easily secured along with simplification of manufacture.

In this embodiment, magnet 23 is press-fitted into frame 22 such that a portion of the lower portion of magnet 23 remains. Protruding portion 232 that protrudes downwards from the lower end of the inner periphery of frame 22 is formed by such press fitting. Particularly, joining portion 231 of magnet 23 is in a contracted state, whereas protruding portion 232 is not forcibly compressed. For this reason, protruding portion 232 naturally spreads in the outer peripheral direction. Thus, the structure of protruding portion 232 that protrude downwards while spreading in the outer peripheral direction from the lower end of the inner periphery of frame 22 can be easily formed by press-fitting magnet 23 into frame 22 with protruding portion 232 being left.

Moreover, as described above, protruding portion 232 has FG magnetized portion 23f that is a second magnetized portion whose pole pitch is narrower than the first magnetized portion at the tip end face thereof, and FG pattern 24 is arranged so as to face FG magnetized portion 23f. Here, protruding portion 232 protrudes downwards while spreading in the outer peripheral direction from the lower end of the inner periphery of frame 22.

That is, the position of FG pattern 24 that is arranged to face the tip of protruding portion 232 gets away from main magnetized portion 23m as protruding portion 232 protrudes downwards. This makes it difficult for FG pattern 24 to be influenced by the magnetism of main magnetized portion 23m. Additionally, the position of FG pattern 24 is arranged further in the outer peripheral direction from the lower end of the inner periphery of frame 22, and also gets away from stator core 12 that is arranged on the inner peripheral side of magnet 23. This makes it difficult to be influenced by the magnetism of stator core 12. In this way, since the motor of this embodiment has protruding portion 232 that protrudes downwards while spreading in the outer peripheral direction from the lower end of the inner periphery of frame 22, and has the tip end face subjected to the FG magnetization, the influence of the main magnetization, or the magnetism emitted from an iron core, on FG pattern 24 that is arranged to face the FG magnetization can be reduced.

Meanwhile, when a structure is adopted in which only an inside cylindrical portion is used for an inner peripheral portion of a frame, a magnet is attached to the inner periphery of the frame, and a protruding portion is provided, strong stress is generated at the root of the protruding portion which comes into contact with the lower end of the inside cylindrical portion. That is, since the portion of the magnet that are brought into close contact with the inside cylindrical portion are compressed, and the compressive force is released at the root of the protruding portion, strong stress concentrates and acts on a narrow range that becomes the root of the protruding portion. When such a stress acts, an inconvenience such as cracking or breaking, is caused in the magnet.

In order to prevent such inconvenience, in this embodiment, tapered portion 222 whose inner diameter becomes larger from the lower end of inside cylindrical portion 221 towards the lower end of frame 22 is provided in frame 22. By providing such tapered portion 222 on the inner peripheral lower side of frame 22, the compressive force to magnet 23 gradually becomes weaker while being distributed along tapered portion 222, from the lower end of inside cylindrical portion 221 towards the lower end of frame 22. In this way, tapered portion 222 functions so as to gradually release the stress that acts on protruding portion 232 from the lower end of frame 22. Since the stress that acts on the root of protruding portion 232 is also relaxed and becomes weak by such a function, cracking or breaking of magnet 23 can be prevented. Since magnet 23 spreads towards the outside from the inside of frame 22 with tapered portion 222 as a guide, protruding portion 232 spreads smoothly via tapered portion 222, so that the roundness at the lower end of protruding portion 232 can also be easily secured. Moreover, since the lower portion of frame 22 no longer has a sharp convex shape by tapered portion 222, there are also effects of prevention against scraping, damage, or cracking of magnet 23 at the time of insertion. Moreover, when magnet 23 is press-fitted, tapered portion 222 can also be utilized as a guide at the time of the press fitting, magnet 23 that is a bonded magnet can be smoothly press-fitted into frame 22 while the compressive force is gradually raised, there are also effects of prevention against breaking or cracking at the time of manufacture.

Although it has been described above that tapered portion 222 has a tapered shape, tapered portion 222 may have a curved shape instead of the tapered shape.

Figure 4:
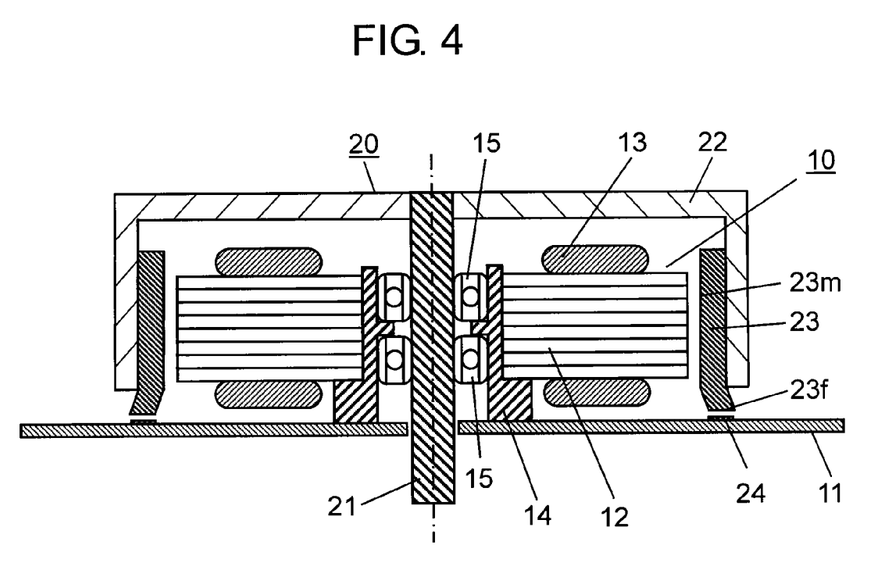
FIG. 4 is a sectional view showing another configuration of the motor.

As long as there is no problem about the strength or the like of magnet 23, a configuration in which tapered portion 222 is not provided may be adopted. FIG. 4 is a sectional view of a motor of another configuration of this embodiment that is configured such that tapered portion 222 is not provided. Even in such a configuration, it is possible to adopt a configuration that has protruding portion 232 that protrudes downwards while spreading in the outer peripheral direction from the lower end of the inner periphery of frame 22, and the influence of the main magnetization, or the magnetism emitted from an iron core, on FG pattern 24, can be reduced.

The above description has been made taking an example in which magnet 23 is directly brought into close contact with inside cylindrical portion 221 and tapered portion 222 of frame 22. Instead of this example, a configuration in which, for example, coating for rust prevention is performed on the surface of a magnet, and the coated magnet is directly brought into close contact with an inside cylindrical portion and tapered portion of the frame may be adopted.

The above description has been made taking an example in which joining portion 231 of magnet 23 is directly brought into close contact with a portion ranging from the lower end of frame 22 to a portion of inside cylindrical portion 221. Instead of this example, joining portion 231 may be directly brought into close contact with a portion ranging from the lower end to a ceiling surface portion of frame 22.

Although the above description has been made taking an example in which the bonded magnet is used as magnet 23, the magnet may include a sintered magnet, a ferrite magnet, etc.

By configuring the motor of the invention as described above, a FG pattern that detects FG magnetization can be arranged in a portion where the influence of main magnetization, or the magnetism from an iron core of a stator is suppressed. For this reason, the precision of speed detection can be secured, it is unnecessary to arrange a speed detection sensor or the like outside the outer periphery of the magnet, and a motor of the configuration that is suitable for miniaturization can be realized.

Since a bonded magnet that has elasticity is used as the magnet, a structure in which one end of the magnet is arranged in a position that is greater than the inner diameter of a rotor frame outside the rotor frame can be realized by a simple manufacturing method.

Moreover, since the magnet can be joined to the rotor frame by press fitting without using an adhesive, rotational accuracy can be improved.

Moreover, breaking or cracking of the magnet can be prevented by providing in the rotor frame with the tapered portion.

As described above, according to the motor of the invention, the motor that can reduce the number of assembling steps to reduce cost, and can attain miniaturization without causing deterioration of rotational accuracy can be provided.

Embodiment 2

Figure 5:
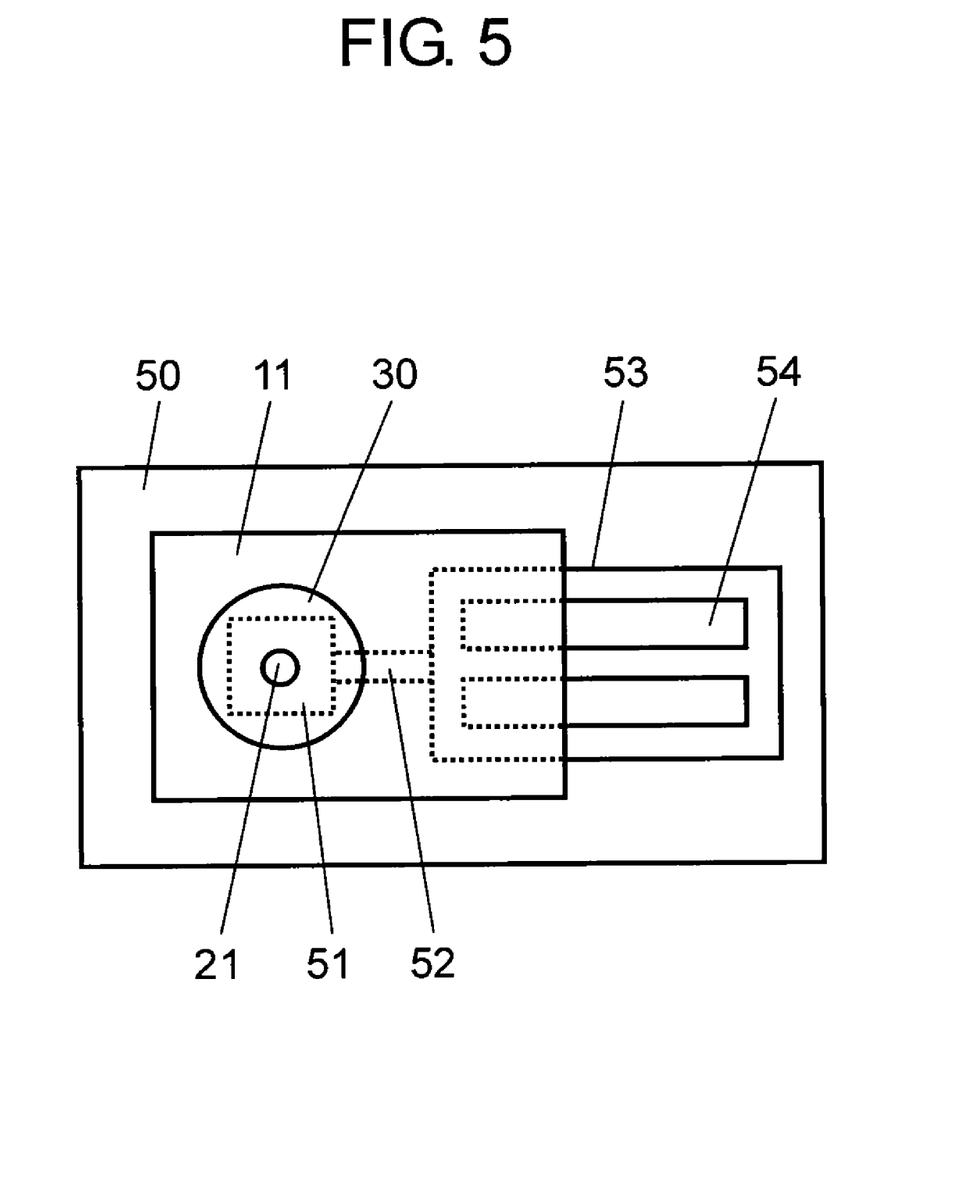
FIG. 5 is a schematic explanatory view of an electronic apparatus in Embodiment 2 of the invention.

FIG. 5 is a schematic explanatory view of an electronic apparatus 50 (for example, a laser printer) in Embodiment 2 of the invention. In FIG. 5, motor 30 described in Embodiment 1 is loaded on board 11. Electronic components (not shown) and the like required for the whole electronic apparatus 50 other than FG pattern 24 (shown in FIG. 1) for speed detection are together loaded on board 11.

The lower end of rotary shaft 21 of motor 30 extends to the lower portion of board 11 through a through hole (shown in FIG. 1) of board 11, and gear box 51 is connected with the lower portion of rotary shaft 21. As described in detail in Embodiment 1, FG pattern 24 is arranged on board 11, and speed detection of motor 30 is performed. The rotational speed of motor 30 is reduced by gear box 51. The rotational driving force of motor 30 is further transmitted to driven body 53 including a plurality of paper feed rollers 54 via link mechanism 52. This rotates the plurality of paper feed rollers 54, thereby performing paper feed.

According to the electronic apparatus of this embodiment, the electronic apparatus that can reduce the number of assembling steps to reduce cost, and can attain miniaturization without causing deterioration of rotational accuracy can be provided.

What is claimed is:
1. An outer rotor type motor comprising:
a stator and a rotor that is rotatably arranged on an outer peripheral side of the stator so as to face the stator,
wherein the rotor comprises a cylindrical rotor frame that is opened at one axial end thereof, and a hollow cylindrical magnet having a substantially uniform thickness and attached to an inner surface of the rotor frame,
wherein the inner surface of the rotor frame has a predetermined inner diameter,
wherein the magnet has a cylindrical joining portion being in contact with the inner surface of the rotor frame, and a cylindrical protruding portion that protrudes out from the open end of the rotor frame in such a manner that the cylindrical protruding portion tapers out towards its protruding end, and
wherein an outer diameter of the protruding portion of the magnet is larger at its protruding end than the inner diameter of the open end of the rotor frame, and the joining portion of the magnet is in contact with at least part of the inner surface of the rotor frame along a range extensive from the open end of the rotor frame towards the other end thereof.

2. The motor of claim 1,
wherein the magnet has a first magnetized portion circumferentially along an inner periphery thereof, and has a second magnetized portion having poles along a tip end face of the protruding end thereof at pitches narrower than those of poles of the first magnetized portion.

3. The motor of claim 1,
wherein the magnet is a bonded magnet that is press-fitted into the internal surface of the rotor frame.

4. The motor of claim 1,
wherein the inner surface of the rotor frame further is tapered out towards the open end thereof in an area near the open end.

5. An electronic apparatus comprising:
a main body case, a driven body provided within the main body case, and a motor connected with the driven body via a link mechanism,
wherein the motor is an outer rotor type motor comprising a stator and a rotor that is rotatably arranged on an outer peripheral side of the stator so as to face the stator,
wherein the rotor comprises a cylindrical rotor frame that is opened at one axial end thereof, and a hollow cylindrical magnet having a substantially uniform thickness and attached to an inner surface of the rotor frame,
wherein the inner surface of the rotor frame has a predetermined inner diameter,
wherein the magnet has a cylindrical joining portion being in contact with the inner surface of the rotor frame, and a cylindrical protruding portion that protrudes out from the open end of the rotor frame in such a manner that the cylindrical protruding portion tapers out towards its protruding end, and
wherein an outer diameter of the protruding portion of the magnet is larger at its protruding end than the inner diameter of the open end of the rotor frame, and the joining portion of the magnet is in contact with at least part of the inner surface of the rotor frame along a range extensive from the open end of the rotor frame towards the other end thereof.

6. The electronic apparatus of claim 5,
wherein the magnet has a first magnetized portion circumferentially along an inner periphery thereof, and has a second magnetized portion having poles along a tip end face of the protruding end thereof at pitches narrower than those of poles of the first magnetized portion.

7. The electronic apparatus of claim 5,
wherein the magnet is a bonded magnet that is press-fitted into the inner surface of the rotor frame.

8. The electronic apparatus of claim 5,
wherein the inner surface of the rotor frame is tapered out towards the open end thereof in an area near the open.

\* \* \* \* \*